United States Patent [19]

Task

[11] Patent Number: 4,580,196
[45] Date of Patent: Apr. 1, 1986

[54] NIGHT VISION COMPATIBLE ILLUMINATION FOR VEHICLE CREWMEMBER WORKSPACE

[75] Inventor: Harry L. Task, Dayton, Ohio

[73] Assignee: The United States of America as represented by the Secretary of the Air Force, Washington, D.C.

[21] Appl. No.: 688,944

[22] Filed: Jan. 4, 1985

[51] Int. Cl.$^4$ .............................................. B64D 47/02
[52] U.S. Cl. ........................................ 362/62; 362/800; 362/226
[58] Field of Search ................... 362/62, 63, 800, 803, 362/226, 254; 244/118.5

[56] References Cited

U.S. PATENT DOCUMENTS

| | | | |
|---|---|---|---|
| 4,152,618 | 5/1979 | Abe et al. | 362/800 |
| 4,211,955 | 7/1980 | Ray | 315/53 |
| 4,217,625 | 8/1980 | Klein | 362/800 |
| 4,277,819 | 7/1981 | Sobota et al. | 362/800 |
| 4,298,869 | 11/1981 | Okuno | 340/782 |
| 4,329,625 | 5/1982 | Nishizawa et al. | 315/158 |
| 4,329,737 | 5/1982 | Triller et al. | 362/800 |
| 4,521,835 | 6/1985 | Meggs et al. | 362/62 |

FOREIGN PATENT DOCUMENTS

| | | | |
|---|---|---|---|
| 47418 | 3/1982 | European Pat. Off. | |
| 2922952 | 12/1980 | Fed. Rep. of Germany | 362/800 |
| 1443468 | 7/1976 | United Kingdom | 362/800 |
| 2098714 | 11/1982 | United Kingdom | 362/800 |

Primary Examiner—Ira S. Lazarus
Attorney, Agent, or Firm—Donald J. Singer; Gerald B. Hollins

[57] ABSTRACT

An arrangement for conveniently changing the illumination in an aircraft cockpit or other enclosure to a spectrum compatible with night vision infrared equipment including provision for easy return to the original illumination source. Selected LED elements are employed in multiple element arrays using a tether connected package that can be excited directly from existing wiring in fixtures.

17 Claims, 3 Drawing Figures

NIGHT VISION COMPATIBLE ILLUMINATION FOR VEHICLE CREWMEMBER WORKSPACE

RIGHTS OF THE GOVERNMENT

The invention described herein may be manufactured and used by or for the Government of the United States for all governmental purposes without the payment of any royalty.

BACKGROUND OF THE INVENTION

This invention relates to the field of general illumination in the crewmember work space of a night-operated vehicle; the desired illumination being compatible with night vision equipment.

The need to see objects and persons which are shrouded by darkness and the relatively advanced state of the solid state imaging systems art combine to make night vision equipment a desirable addition or retrofit in many types of military apparatus. Such capability is especially desirable, in the tactical military environment, where objects having a heat signature, such as energy dissipating vehicles and persons are to be detected in the dark. Frequently a capability of this type is needed as an addition to an existing piece of equipment, such as an older model aircraft. A need for such night vision capability also is found in the surveillance systems and security systems employed in civilian life.

Night vision equipment for these uses is usually operated on the principle of detecting the near or far infrared heat signature radiation from the objects being detected, or some fraction of the total near and far infrared spectrum. With presently available equipment, for example, it is possible for the pilot of an aircraft to readily detect moving vehicles while flying several thousand feet above the terrain of vehicle movement. The sensitivity of third generation night vision goggle apparatus may be appreciated from the fact that the infrared radiation from a lighted cigarette is sufficient to illuminate the objects in a large room for viewing with such goggle apparatus.

In the usual aircraft arrangement, therefore, night vision capability is afforded through the use of an electronic image binocular apparatus which includes an infrared responsive retina member and a solid state imaging display, all of which are located in a small package mounted on the pilot's helmet or otherwise arranged to be located between the pilot's eyes and the scene being viewed. Frequently the equipment of this type is arranged to be portable or of an add-on or retrofit nature for use with existing aircraft and for easy removal during other uses of the aircraft.

When infrared responsive apparatus of high sensitivity is operated in most aircraft cockpits, the operator soon realizes that an incompatibility exists between the infrared imaging apparatus and normal heat sources located within the aircraft cockpit. The lighting ordinarily used for instrument illumination, for control identification, and for normal human endeavors in the cockpit is particularly troublesome to night vision equipment. In addition to the basic receiving of energy from a nearby strong infrared source, in this scenario the tendency of sensitive infrared detectors to "bloom" or enlarge the physical size of a detected object in proportion to the intensity of the object's radiation causes a significant portion of the infrared detecting field to be disabled to a finite time period following the reception of images originating with such cockpit hotspots. A phenomenon of this type is frequently observed for example, when a television camera is focused on a sun reflecting object, a bright light, or a flame in a TV sportscast.

The present invention provides an improved aircraft cockpit lighting arrangement which of course may also be applied to land vehicles, water craft, surveillance equipment, and other uses where infrared responsive apparatus is threatened with the possibility of locally sourced large signal swamping. The present invention also offers a fast and convenient arrangement for changing the cockpit or vehicle control area lighting in order to accommodate infrared equipment—an arrangement which can easily be reversed to alternate or normal forms of cockpit lighting when needed.

The patent art includes several examples of lighting achieved with light emitting diode elements are disclosed in the present invention. This patent art includes the patent of Stephen W. Ray, U.S. Pat. No. 4,211,955, which concerns a solid state lamp having an integrated circuit chip fabricated light source. The Ray light source is enclosed in a bulb-like transparent envelope and mounted on a screw thread base so as to resemble a conventional incandescent lamp. The Ray apparatus additionally includes a rectifying circuit arrangement allowing excitation of the integrated circuit light emitting diode elements from either alternating current or direct current- and further includes an electronic circuit for regulating the current flow level in the light emitting diode elements. The provision of a directly interchangeable replacement unit for an incandescent filament lamp including the use of a similar package configuration, is an underlying concept of the Ray invention.

The patent art concerning illumination from a light emitting diode source also includes the commonly assigned patents of Yasuo Okuno, U.S. Pat. No. 4,298,869, and Jun-ichi Nishiazawa et al, U.S. Pat. No. 4,329,625, which concern the use of light emitting diode arrays in numeric displays, lamps, multi-color devices, and other lighted objects. Both the Okuno and Nishizawa et al patents include electrical circuit arrangements suitable for energizing light emitting diode devices, along with information concerning the electrical and optical characteristics of light emitting diode devices. The disclosure of these two patents is hereby incorporated by reference into the present specification.

SUMMARY OF THE INVENTION

An object of the present invention is to provide an illumination source which is compatible with the operating characteristics of present-day night vision apparatus.

Another object of the invention is to provide an illumination source having relatively small output in the infrared spectral regions employed for night vision apparatus.

Another object of the invention is to provide a convenient replacement for the incandescent lamps used in operator control areas of vehicles equipped with infrared night vision imaging apparatus.

Another object of the invention is to provide a small, lightweight, high-efficiency source of general illumination for use in the cockpit of an aircraft.

Another object of the invention is to provide a quickly retrofittable and removable illumination source for an aircraft cockpit which also includes night vision goggle apparatus susceptible to infrared source saturation.

Additional objects and features of the invention will be understood from the following description and the accompanying drawings.

These objects are achieved by having a night vision apparatus which includes a vehicle control enclosure incorporating a plurality of manually-operable vehicle controls, a plurality of vehicle function indicating instruments and support means for a human operator adjacent the controls and instruments, electrical connection means including a plurality of lamp sockets dispersed about the vehicle control enclosure for receiving incandescent filament lamps capable of night illumination of said controls, instruments and enclosure, an array of light emitting diode elements mounted on a portable substrate member, means for attaching said substrate and diode array to surfaces adjacent said lamp sockets within said vehicle control enclosure, means connected to said diode element array, and to a connector receivable in said lamp sockets for energizing said light emitting diode array with electrical energy.

DETAILED DESCRIPTION

The addition of night vision capability to existing equipment such as aircraft or surveillance observation sites is a frequent need in modern defense operations, particularly in the limited scope tactical military encounters known since World War II. In both the Korean and Vietnam encounters, for example, modern military equipment was called upon to limit darkness-shielded guerrilla actions and was therefore made more effective through the use of night vision capability. A common need in such usage is to quickly and reversibly adapt existing equipment such as daylight oriented aircraft for night operation. Frequently this capability is provided by the addition of ANVIS (Aviator Night Vision System) equipment, which has now gone through three to four generations of evolution.

Usually ANVIS equipment is arranged to be highly responsive in the near infrared spectral regions and weakly responsive or totally unresponsive in the blue and green regions of the visible spectrum. One of the significant problems encountered in equipping most aircraft with such night vision equipment therefore involves the tendency of the night vision equipment to undesirably respond to the relatively high levels of infrared radiant energy existing in the crewmember vision lighting of most aircraft. Usually this crewmember vision lighting is provided by incandescent filament lamps which are housed in lensed or other types of lamp holding fixtures dispersed about the aircraft cockpit. Such lighting is often in addition to incandescent filament lamps used for instrument panel and manual control lighting purposes. In some aircraft as well as in some other non-aircraft night vision situations, fluorescent lighting which also has significant energy output in the night vision active infrared spectral regions, may be encountered. The red spectral lines in the Mercury gas used in fluorescent lamps produces a particular conflict between illumination and night vision equipment.

Electroluminescent lighting and incandescent filament lamps equipped with infrared blocking filter elements have been suggested as resolutions for the conflict between crewmember lighting and night vision equipment in some vehicles. In the aircraft situation, electroluminescent lighting requires the use of alternating current energy at relatively high voltage, while incandescent lamps employing infrared filters require a bulky physical package and involve the expenditure of undesirable energy quantities, since a principal output of an incandescent filament device lies in the red and infrared spectral regions which are the same regions blocked by the necessary filter.

Figure 1:
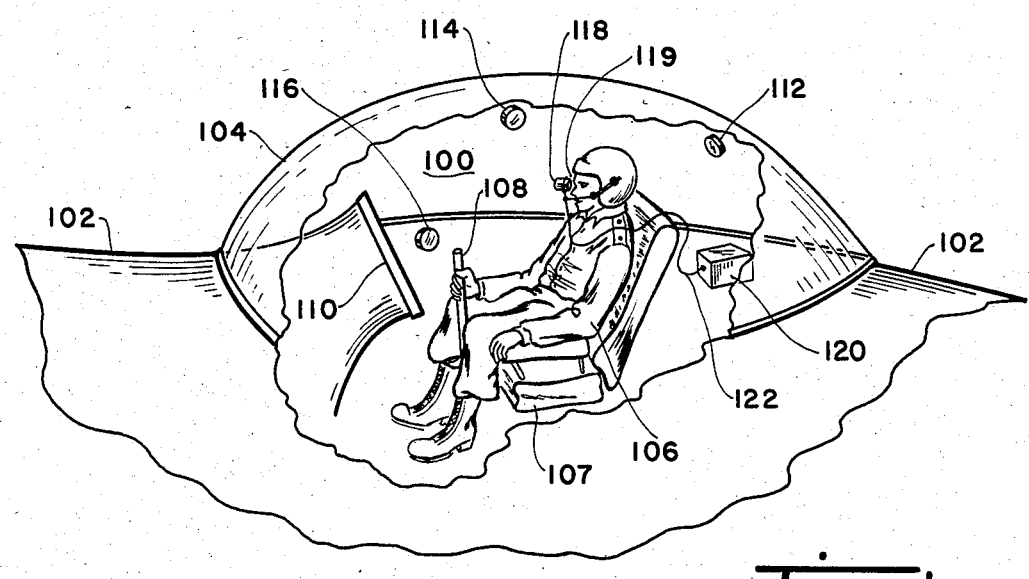
FIG. 1 is an overall view of a vehicle control enclosure such as an aircraft cockpit, which uses illumination apparatus in accordance with the present invention.

A representation of an aircraft cockpit wherein night vision capability is provided is shown in FIG. 1 of the drawings. The FIG. 1 cockpit 100 represents the arrangement which might exist in a fighter or observation aircraft or other single-seat aircraft. The invention of course is not limited to any particular type of aircraft or to aircraft in general, or to vehicles in general. Also represented in FIG. 1 is the aircraft fuselage 102, the aircraft transparent canopy 104, a pilot 106, a pilot seat 107 which is connected to the aircraft in a manner but not shown in FIG. 1, and a control stick 108 which is manipulated by the pilot 106. Also shown in FIG. 1 is the aircraft instrument panel 110 and a plurality of cockpit and instrument panel illuminating fixtures 112, 114, and 116; these fixtures are dispersed and aimed about the cockpit to provide pilot-friendly general illumination as is known in the art.

The pilot 106 in the FIG. 1 drawing is shown to be using a night vision goggle apparatus 118 which may be mounted from the pilot's flight helmet or alternately may be suspended from some part of the aircraft and arranged to be mechanically movable with the pilot's head. In the preferred helmet-suspended arrangement for the night vision goggle apparatus 118, a tether cord 122 is used to connect the goggle with an electronics package 120, it being contemplated that the goggle 118, the package 120 and the tether 122 are portable, lightweight units conveniently removable from the aircraft when not needed.

As may be observed from the relative locations of the pilot 106 and the terrain viewing aperture available to the pilot, frequent aiming of the night vision goggle 118 at the instrument panel 110, the control stick 108, and other objects within the cockpit 100 inevitably occur during normal operation of the aircraft. Frequent transition of the night vision goggle view field between terrain viewing at the front and sides of the aircraft and the intense radiating infrared sources within the aircraft cockpit, therefore, can cause undesirable saturation, blooming, and recovery time delays in the operation of the night vision goggle 118. Additionally, reflections from internal cockpit lighting sources such as from the instrument panel 110 produce undesirable images that also interfere with the desired night vision goggle viewing through the canopy to the outside scene.

Figure 3:
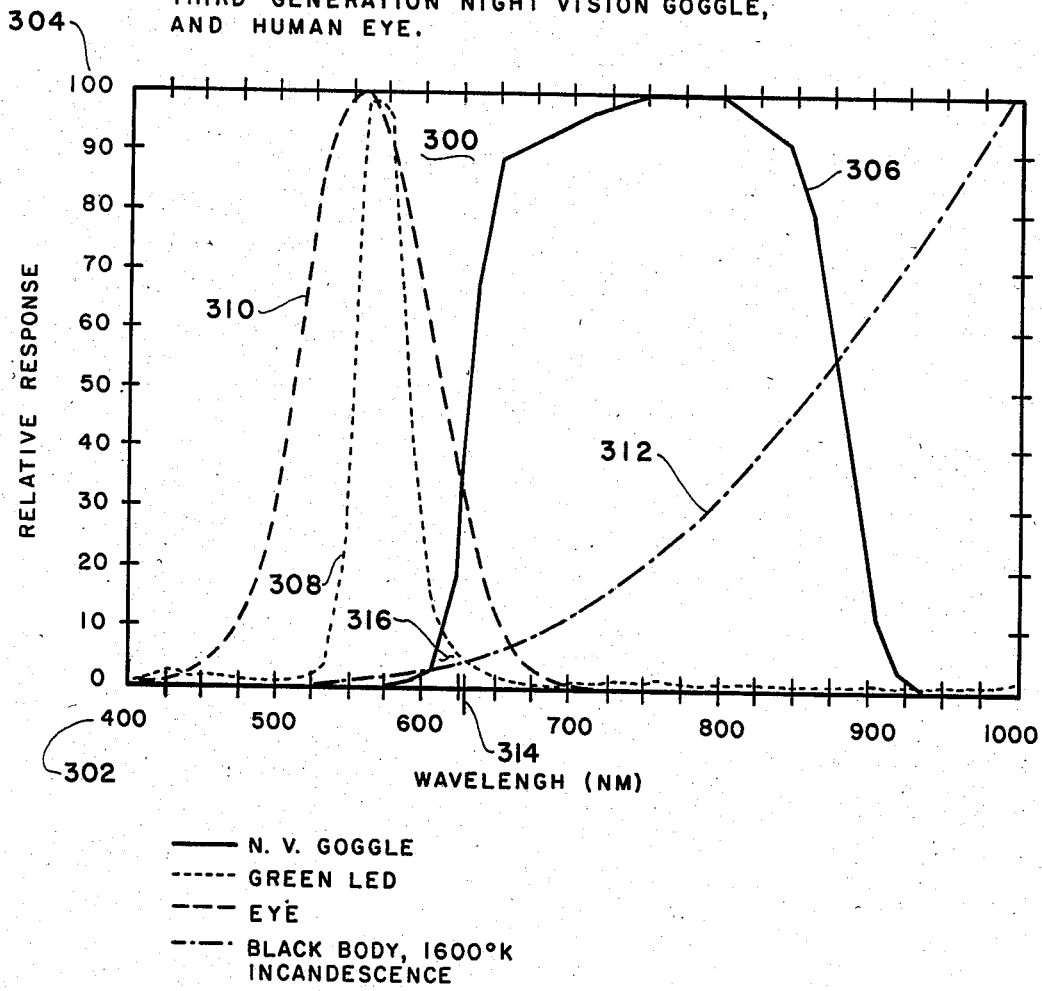
FIG. 3 shows the relative spectral response of a night vision apparatus, the eye, and several illumination sources pertinent to the FIG. 1 enclosure.

A desirable solution for these problems in operating night vision goggles resides in the use of illumination which is compatible with the goggle apparatus within the cockpit 100. Such illumination can originate with a light emitting diode array of selected spectral response in the fixtures 112, 114 and 116. The light from such arrays can be arranged to fall outside of the spectral response of the night vision goggle 118, as is shown in FIG. 3 of the drawings and described below. According to a further aspect of this overall arrangement, the night vision goggle apparatus 118 is disposed a short distance 119 in front of the pilot's eyes in order that the pilot be able to see around the goggle eyepiece in viewing the instrument panel 110 and other objects within the cockpit by tilting his head in an up, down or sideways direction and using peripheral vision around the goggle eyepiece.

The cockpit lighting fixtures 112, 114 and 116 are shown only in the grossest of detail in FIG. 1, it being contemplated that such fixtures may include a protective covering element, optical focusing apparatus, light shielding barriers, possibly a reflecting element and other apparatus known in the art, in order that the desirable pilot-friendly illumination within the cockpit 100 be achieved. In the usual aircraft arrangement, these fixtures also include the commonly employed bayonet spring-loaded single or multiple contact socket receptacle for an incandescent filament lamp. Alternately, an in-line filament lamp having electrical contacts at each end of a tubular glass enclosure member or other socket receptacle apparatus may be involved.

Figure 2:
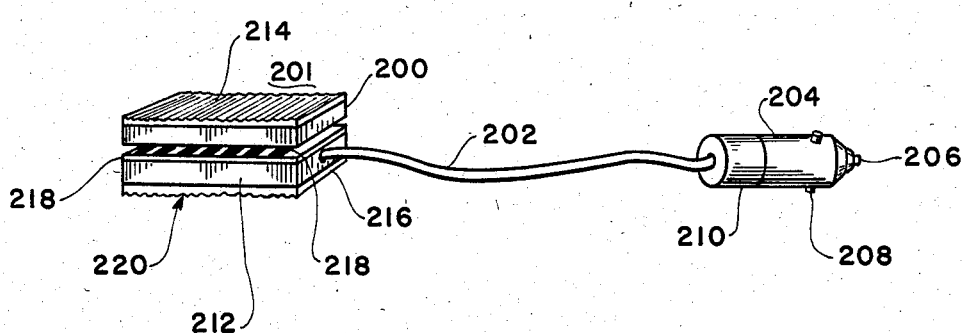
FIG. 2 is an individual illumination source of the type used in FIG. 1.

A light emitting diode (LED) assembly suitable for replacement of an incandescent filament lamp in the fixtures 112, 114 and 116 is shown in 201 in FIG. 2 of the drawings. The LED assembly 201 includes a printed circuit board substrate 212 on which are located a plurality of electrically-conductive film members 218 which are electrically connected to the diode elements of an LED array contained within an array housing 200. The array housing 200 is covered by a diffusing cover assembly 214 which is capable of arranging the LED light output in a pattern as may be needed for the fixtures 112, 114 and 116. Such objects as fresnel lenses, etched diffusing members, and plastics may be employed in the diffusing cover assembly 214.

An electrical connection tether cable 202 is used to supply exciting electrical energy to the LED assembly 201, this tether cable can be of any convenient length and is preferably arranged to permit location of the assembly 201 on a cockpit surface adjacent the fixtures 112, 114 and 116, while an electrical connector 204 is received in the normal lamp socket of one of the fixtures 112–116. The pins 208 and the center electrode 206 of the illustrated bayonet connector 204 may be located according to the established standards for an incandescent filament lamp in order that the connector 204 be directly interchangeable with the customarily used incandescent lamp. The bayonet pins 208 are normally polarized negative and the center electrode 206 positive in supplying electrical energy to the assembly 201. A strain-relief fitting 210 is used to mechanically retain the tether cable 202 in the connector 204. The tether cable 202 may be anchored to the printed circuit board substrate 212 by mechanical arrangements or molding arrangements which are known in the art.

On the lower surface of the printed circuit board 212 is disposed an attachment medium 216 which is arranged for convenient mounting of the assembly 201 on the cockpit surfaces adjacent the fixtures 112, 114, and 116. The attachment medium 216 may include an adhesive coating on the exterior facing surface 220, or alternately and preferably, may include one of the elements of a looped maze and barbed teeth detachable fastener of the commercially available Velcro ® fastener type. The name Velcro ® is a trademark of American Velcro Incorporated, a supplier of suitable fasteners for the present use. Other fastening arrangements known in the art may also be employed with the LED assembly 201 or a variety of different fastener arrangements employed for the differing surfaces on which the LED assembly 201 is to be mounted in an aircraft. It is of course contemplated that a plurality of the assemblies 201 will be desired in each aircraft or use application of the invention. Each of these assemblies may be connected to a different fixture 112, 114 and 116 or a common fixture socket connection for a plurality of the assemblies 201 arranged.

Factors which need consideration with respect to the electrical circuitries used in connecting individual LED elements to the 28-volt DC or the 5- to 6-volt AC power commonly used in present-day aircraft, or to the 12-volt DC power commonly used in present-day land vehicles, or the 120-volt AC power commonly used in fixed locaton land sites in which the invention may be employed, are discussed in the above-incorporated by reference patents of Okuno and Nishizawa et al. Generally, some combination of serial and parallel connection of individual LED elements in an array is desirable in such electrical circuits, together with some form of current limiting device such as an electrical resistor or a current regulating transistor or a magnetic current limiter or other devices as are known in the electrical art.

As is also discussed in these incorporated patents, an electrical rectifying circuit of either the half-wave or preferably of the full-wave bridge type, may also be incorporated in the FIG. 2 apparatus, either within the assembly 201 or inside the connector 204. Such a rectifier enables operation of the direct current LED devices from alternating current energy or in the case of energy supplied by a direct current source, prevents accidental damage of the LED elements from the application of reversed polarity excitation. The circuitry used with the LED elements may also include a current, voltage, or power regulating circuit capable of maintaining a desired energy level in the array element, despite variations in the input energy source, or alternately, capable of providing illumination variations in the light output of the array 201 in response to sensed ambient conditions or other pilot needs or factors. Regulators of this type are also described in the above-referenced two patents.

The relationship between a desired spectral emission from the LED assembly 201 and the spectral response of a night vision system is shown at 308 and 306 in the family of curves 300 in FIG. 3 of the drawings. The family of curves 300 also includes a curve 310 indicating the response of a typical human eye and a curve 312 indicating in part the spectral output of a black body operating at a temperature of 1600 degrees Kelvin. The 1600° Kelvin curve 312 closely resembles the spectral response expected from an incandescent filament lamp operated in a dimmed or red-rich spectral condition. The spectral response relationship shown in FIG. 3 further includes a scale of wavelength values 302 between 400 and 1000 nanometers and a scale of relative response amplitude values 304 between 0 and 100 percent.

The conflict between a night vision apparatus as represented by the curve 306 and the emission of an incandescent filament as represented by the curve 312 is apparent in FIG. 3, clearly the night vision apparatus will be energized by emission of the type represented by the curve 312 and such energization will be significantly stronger than the emission from a similar spectrum located hundreds or thousands of feet more distant from the night vision apparatus in a viewed target scene.

The improved relationship between night vision apparatus response and the spectral output of a yellow-green emitting LED element as represented by the curve 308 is also readily apparent in FIG. 3. As shown by the curves 306 and 308, the response of the night vision equipment and the output of a desired LED element are each at the 10% of maximum level or below in the area of spectral overlap 316. Clearly the relationship of the curves 308 and 306 is compatible with avoiding saturation and other interference phenomena between cockpit illumination and a night vision apparatus in the FIG. 2 arrangement.

As described in the above two incorporated-by-reference patents, the spectral distribution of the energy emitted by light emitting diodes is variable to a limited degree with changes of semiconductor material, operating current level, and the dopants used with a particular semiconductor material. Compounds of indium, gallium and phosphorus or aluminum, indium, and phosphorus provide emission in the yellow portion of the spectrum, while compounds of gallium and phosphorus; indium, gallium and phosphorus; or aluiminum, indium and phosphorus provide a greenish colored emission from a light emitting diode and compounds of gallium, aluminum and arsenic; gallium, arsenic and phosphorus; or indium, gallium, arsenic and phosphorus are found to provide red colored emission. A green or yellow-green colored emission is preferred for the illumination of the present invention in order that the acceptance band of the night vision apparatus be avoided. Regardless of the visible spectrum color selected for use in the present invention, it is desirable for the employed light emitting diodes to have zero or limited emission in the infrared spectral region, which is used for the night vision apparatus.

By way of comparison, the location of the spectral peak of a typical red LED element is shown at 314 in FIG. 3. Although the location of this peak falls outside the peak response portion of night vision apparatus characterized in FIG. 3, the skirts of a red LED element curve could be expected to overlap the night vision apparatus curve 306 to a much greater degree than is present for the previously described yellow-green LED element. This relationship would increase the size of the overlap region 316 and provide an undesirably large response from the night vision equipment. A red LED response of this nature would, however, be preferably for night vision use to the situation which exists with the present-day incandescent filament illumination represented by the curve 312 in FIG. 3.

Several possibilities exist for resolving the spectral conflict between incandescent filament lamp illumination sources normally used within the instruments on the panel 110 in FIG. 1 and in the aircraft control element handles of FIG. 1 with the night vision response. These possibilities include replacement of such instrument and control lamps with the same preferred green-yellow LED elements described above and also dimming or turning off these particular incandescent lamps while the night vision equipment is in use. In the dimming or turning-off option, reliance would be made on the general cockpit illumination provided by the LED elements connected to the fixtures 112, 114 and 116 for reading the instruments at least for the duration of the night vision equipment useage. The use of indirect instrument face lighting and selected light reflecting colors in the instrument housings would of course decrease the amount of infrared energy emitted by a particular instrument even when incandescent filament lamps are employed in the panel 110 instruments.

It should also be noted from the curves 300 in FIG. 3 that the preferred green-yellow LED spectrum for the FIG. 9 cockpit environment is desirable from the visual acuity of the human eye standpoint—the peak of the green-yellow LED response curve and the peak of the typical eye response curve shown at 310 in FIG. 3 are sufficiently close to assure minimum illumination levels from the LED array will be needed to achieve the desired level of pilot vision.

The apparatus of the present invention is therefore capable of providing illumination which is compatible with night vision equipment used in aircraft or vehicles or surveillance situations. Compatibility in this sense refers to the ability of the described apparatus to provide illumination that is visible to the human eye, but substantially invisible in the spectral frequencies employed for night vision apparatus. In addition to the night vision compatibility, the illumination apparatus of the present invention provides an illumination source which is of greater electrical-to-optical transducer efficiency and therefore requires less energy for a given level of illumination and reuires less provision for cooling of the illumination source. The illumination apparatus of the present invention is also capable of longer life and smaller physical size than the incandescent lamp source frequently used. The efficiency of the present illumination source is also notably greater than that of an incandescent lamp combined with an infrared rejecting filter, as has been considered for use with night vision euipment heretofore. Light emitting diodes suitable for use in the present invention are available in the commercial market and are frequently packaged in the form of 2, 4, or 8 LED elements in a single package.

Although the apparatus of the present invention has been described in connection with aircraft, vehicles or surveillance systems, use of the invention is not limited to these environments and may be extended to other situations wherein the spectrum of conventional illumination sources is undesirable.

While the apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Night vision aircraft apparatus comprising:
    an aircraft cockpit enclosure including a plurality of manually operable aircraft controls, a plurality of aircraft function indicating instruments and support means for a human operator adjacent said controls and instruments;
    electrical connection means including a plurality of lamp sockets dispersed about said cockpit enclosure for receiving incandescent filament lamps capable of night illumination of said controls, instruments, and enclosure;
    an array of light emitting diode elements mounted on a portable substrate member;
    means for attaching said substrate and light emitting diode array to surfaces adjacent said lamp sockets within said cockpit enclosure; and means connected to said diode element array and to a connector receivable in one of said lamp sockets, for energizing said light emitting diode array with electrical energy;

whereby night vision compatible illumination from said light emitting diode array is quickly and temporarily achieved without alteration of said incandescent filament lamp receiving sockets and electrical connection means.

2. The apparatus of claim 1 wherein said light emitting diode elements are of the green light emitting type and have relatively small energy output at wavelengths longer than 650 nanometers in the infrared spectral region.

3. The apparatus of claim 1 further including infrared energy responsive image intensifying means usable by said human operator for night terrain viewing, said light emitting diode lighted cockpit controls and instruments being visible to said operator external to the field of said image intensifying means and substantially invisible through said image intensifying means in the relatively small infrared illumination of said light emitting diode elements.

4. The apparatus of claim 3 wherein said image intensifying means has little spectral response in the wavelengths shorter than 600 nanometers.

5. The apparatus of claim 1 wherein said light emitting diode array includes a plurality of light emitting diode elements connected into a series electrical circuit.

6. The apparatus of claim 4 wherein said diode array further includes current limiting means for controlling the current flow in said diode array in the presence of electrical energy source variations and light emitting diode characteristics variations.

7. The apparatus of claim 1 wherein said diode array includes a plurality of parallel connected electrical series circuits, each series circuit including electrical current limiting means.

8. The apparatus of claim 1 wherein said light emitting diode elements in said array are oriented to a plurality of different illumination directions for dispersing illumination to a plurality of points within said cockpit enclosure.

9. The apparatus of claim 1 wherein said electrical connection means includes electrical current varying means for altering the intensity of said illumination within said cockpit enclosure.

10. The apparatus of claim 1 further including rectifier circuit means connected between said socket compatible connector member and said light emitting diode elements for converting alternating current incandescent lamp exciting energy to direct current energy capable of exciting said light emitting diode elements.

11. The apparatus of claim 1 wherein said means for attaching includes adhesive means for retaining said substrate on said surface.

12. The apparatus of claim 1 wherein said means for attaching includes a looped maze and barbed teeth separable fastener.

13. The apparatus of claim 1 wherein said array of light emitting diode elements also includes a light diffusing lens means for dispersing light from said light emitting diode array controls, instruments, and cockpit enclosure.

14. The apparatus of claim 1 wherein said electrical connection means includes a source of 28-volt direct current.

15. The apparatus of claim 1 wherein said electrical connection means includes a source of 6-volt alternating current.

16. The apparatus of claim 1 wherein said means for energizing includes an electrical tether conductor connected between said diode element array and said connector receivable in said lamp circuit.

17. The apparatus of claim 1 including a plurality of said lamp sockets.

* * * * *

UNITED STATES PATENT AND TRADEMARK OFFICE
CERTIFICATE OF CORRECTION

PATENT NO. : 4,580,196

DATED : April 1, 1986

INVENTOR(S) : Harry L. Task

It is certified that error appears in the above-identified patent and that said Letters Patent is hereby corrected as shown below:

Column 7, line 50, "preferably" should read --preferable--.

Column 8, line 8, "Fig. 9" should read --Fig. 1--.

Signed and Sealed this

Nineteenth Day of August 1986

[SEAL]

Attest:

DONALD J. QUIGG

Attesting Officer

Commissioner of Patents and Trademarks